(12) United States Patent
Tan et al.

(10) Patent No.: US 11,258,281 B2
(45) Date of Patent: Feb. 22, 2022

(54) INTELLIGENCE AC TO DC MAXIMUM POWER MANAGEMENT METHOD OF A BATTERY CHARGER

(71) Applicant: PHIHONG TECHNOLOGY CO., LTD., Taoyuan (TW)

(72) Inventors: Yan-Keng Tan, Taoyuan (TW);
Mu-Hsun Chen, Taoyuan (TW);
Chen-Chan Lin, Taoyuan (TW);
Shih-Hen Lin, Taoyuan (TW);
Ming-Jyun Li, Taoyuan (TW);
Yuan-Chang Chen, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 91 days.

(21) Appl. No.: 16/550,745

(22) Filed: Aug. 26, 2019

(65) Prior Publication Data
US 2021/0006081 A1    Jan. 7, 2021

(30) Foreign Application Priority Data
Jul. 1, 2019  (TW) ................................ 108123137

(51) Int. Cl.
*H02J 7/00* (2006.01)
*H02J 7/04* (2006.01)
*H01M 10/44* (2006.01)
*H01M 10/42* (2006.01)

(52) U.S. Cl.
CPC ......... *H02J 7/0047* (2013.01); *H01M 10/443* (2013.01); *H02J 7/007192* (2020.01); *H02J 7/045* (2013.01); *H01M 10/4257* (2013.01); *H01M 2010/4278* (2013.01)

(58) Field of Classification Search
USPC ........................................................ 320/152
See application file for complete search history.

(56) References Cited

U.S. PATENT DOCUMENTS

| 8,773,077 | B1* | 7/2014 | Elmes | H02J 7/022 320/145 |
| 2005/0099156 | A1* | 5/2005 | Brenner | H02J 7/0036 320/116 |
| 2015/0258909 | A1* | 9/2015 | Kim | B60H 1/00778 701/36 |
| 2016/0046199 | A1* | 2/2016 | Butler | H02J 7/00036 320/106 |
| 2017/0057376 | A1* | 3/2017 | Murata | B60L 58/27 |

* cited by examiner

*Primary Examiner* — Bryce M Aisaka
(74) *Attorney, Agent, or Firm* — WPAT, PC

(57) ABSTRACT

An intelligence AC to DC maximum power charging management method of a battery includes providing a battery charger having a power conversion unit coupled to a charging control device, which contains a micro-controller, a voltage detection unit, a current detection unit, a temperature sensor, and a communication port, and providing a battery pack electrically connected to the battery charger enabling the charging controller to provide charging management for the battery pack, wherein the micro-controller can calculate charging power through received battery voltage, battery charger current, and temperature of the battery charger and tracking the maximum output charging power.

10 Claims, 7 Drawing Sheets

INTELLIGENCE AC TO DC MAXIMUM POWER MANAGEMENT METHOD OF A BATTERY CHARGER

TECHNICAL FIELD

The present invention generally relates to a power management method of a battery charger, and more particularly to an intelligence AC to DC maximum power management method of a battery charger.

BACKGROUND

Electronic equipments, for example, smart phone, laptop computer, tablet, or other electromechanical devices such as electric motorcycles, electric bicycles, etc., these electronic devices or electromechanical devices generally equipped with an internal rechargeable battery. Since the volume of these potable electronic devices or the internal space of the electromechanical device that can accommodate the battery are limited, and the capacity of the battery cells configured for these devices are also limited, it is necessary to charge these battery cells with a charging device making these portable electronic devices or electromechanical device can be reused.

Selecting an appropriate battery charger with a suitable charging method requires evaluating charging characteristics in different types of battery chargers.

In traditional battery charger, it operates in a fixed DC output current, the battery voltage rises from low to high, in this manner the charger still require having enough wattage in its design to cope the occurrences of maximum power in a short period of time. For example, FIG. 1 illustrates the output current (I_output) and output voltage (V_output) curves of the charger during a complete charging process, where the dashed curve 101 represents the output current (I_output) of the charger, and the solid line curve 103 represents the output voltage of the charger (V_output). The entire charging process includes a pre-charging mode, a constant current mode, a constant voltage mode, and a complete charging mode. However, at the beginning the charging power is relative low due to the charger can't output the maximum power of the power supply resulting a low charging power efficiency and therefore lengthening the charging time. The traditional way of battery charging as described above, the battery charger utilizes a two stage constant current-constant voltage charging method including a first pre-charging stage using a predetermined small current to charge the battery for a short period of time and then charge the battery with the maximum current to reach the desired voltage, a second constant-voltage charging stage using a constant voltage to charge the battery, once the battery voltage rises to the regulated voltage, the charging current is reduced, and the battery voltage is regulated to avoid overcharging. In this mode, when the battery is fully charged and the battery impedance is reduced, the current is gradually reduced. When the current drops to a predetermined level, charging process stops.

The conventional charging method can only charge the battery with a fixed maximum current, and the output power varies with the battery voltage, therefore the maximum power cannot be maintained.

In order to solve the above issue, the present invention proposes a power management method of a battery charger to achieve fast charging of the battery, to reduce waiting time of the users, and to improve their working efficiency by detecting the battery voltage, charging current and charging temperature, and determining the charging procedure for charging the battery. A specific way is utilized a microcontroller to calculate, adjust, track the charging power, and tune the charging condition according to the instant statuses of the charger and the battery.

SUMMARY OF THE INVENTION

In this invention, an intelligence AC to DC maximum power management method of a battery charger is proposed, which can adjust the charging power through calculation of a microcontroller and tune the charging condition according to the instant statuses of the charger and the battery.

To realize the above purpose, we propose an intelligence AC to DC maximum power management method of a battery charger, which includes providing a battery charger having a power conversion unit coupled to a charging control device, which contains a micro-controller, a voltage detection unit, a current detection unit, a temperature sensor, and a communication port, and providing a battery pack electrically connected to the battery charger enabling the charging controller to provide charging management for the battery pack, wherein the micro-controller can calculate charging power through received battery voltage, battery charger current, and temperature of the battery charger and tracking the maximum output charging power.

In accordance with one aspect of the disclosure, the instant output charging power tracking is accomplished through detecting the battery voltage, feeding the battery voltage into a logic unit of the microprocessor to perform calculation, and then detecting instant battery voltage, output current of the batteries and variances of the charger temperature to adjust DC output power of the charger through outputting updated power control signals from the microcontroller.

In accordance with one aspect of the disclosure, the charger further includes a plurality of output switches electrically connected to output terminals of the charging control device and the battery pack.

In accordance with one aspect of the disclosure, the control signal transmitted to the power conversion unit is through an optical coupler coupled between the power conversion unit and the charging control device.

In accordance with one aspect of the disclosure, the charger includes a charging procedure determined by communicating with the battery pack, which is sequentially performed in a pre-charging mode, a maximum power mode, a constant voltage mode, and a completed charging mode.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

As described in previous section, in this invention, an intelligence AC to DC maximum power management method of a battery charger is proposed, which can adjust the charging power through calculation of a microcontroller and tune the charging condition according to the instant statuses of the charger and the battery.

Figure 1:
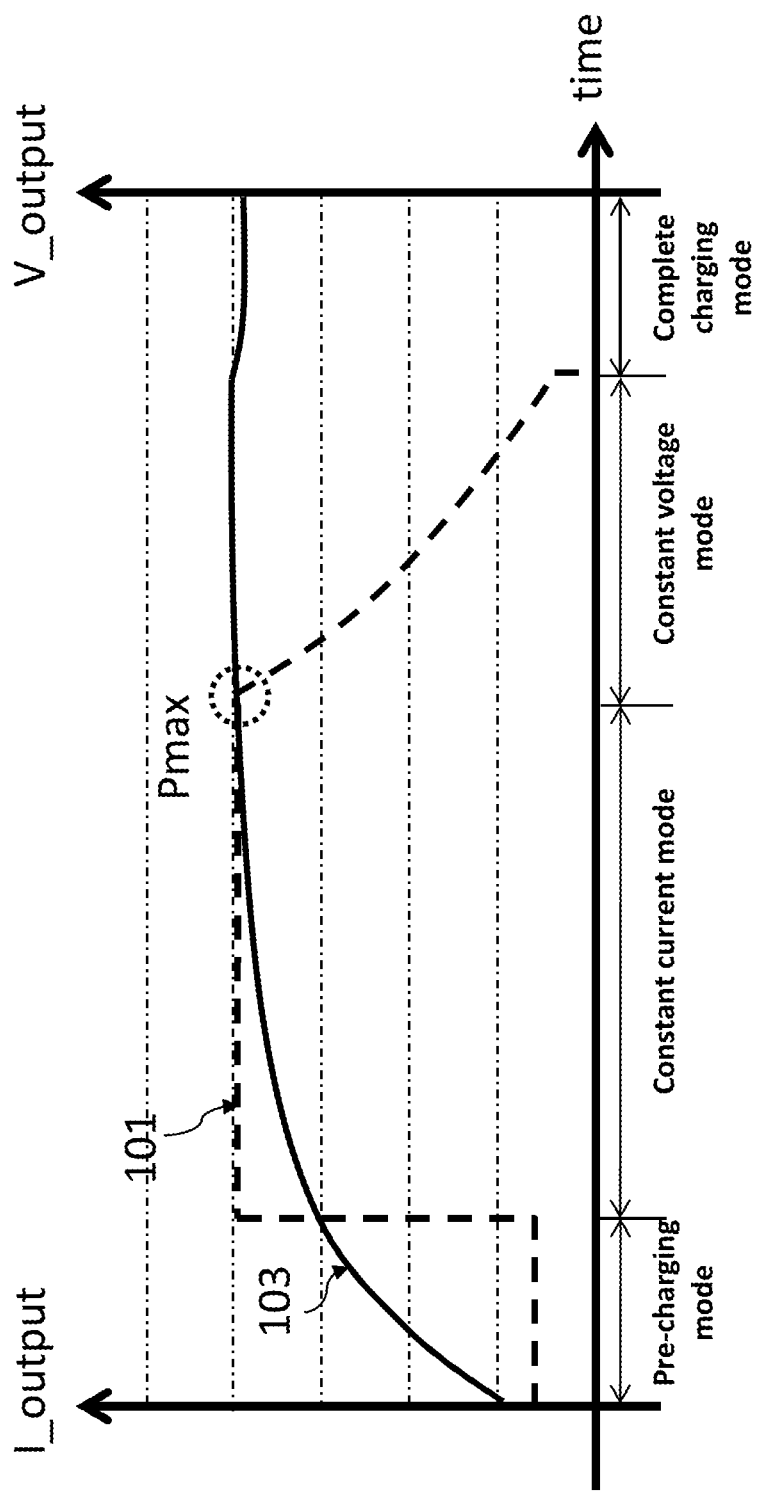
FIG. 1 illustrates a battery charging curve according to the prior art.
Figure 2:
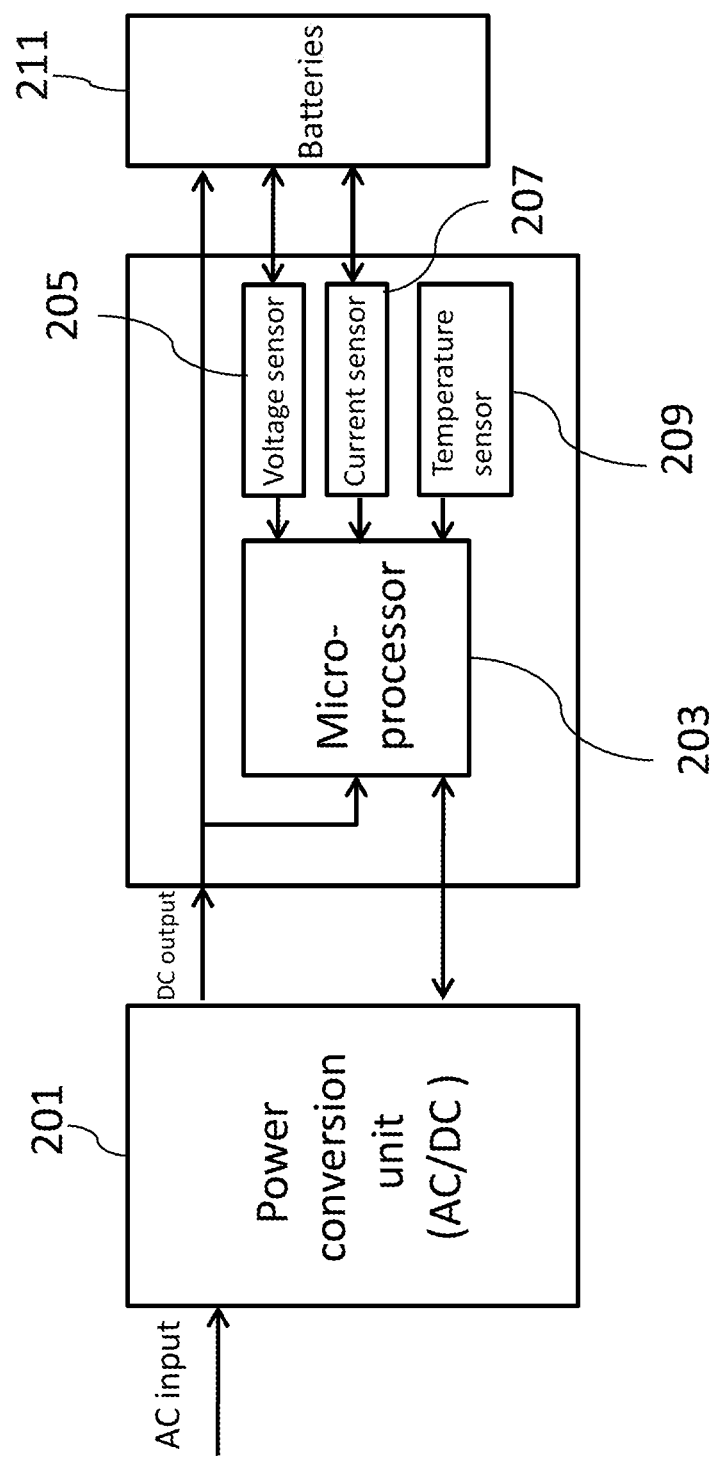
FIG. 2 illustrates a block diagram of charger configuration according to the present invention.

In order to improve the charging efficiency and shorten the charging time, a charger configuration adopted by the present invention is depicted in FIG. 2, which includes an AC/DC converter 201, a microprocessor 203, a voltage detection unit 205, a current detection unit 207, and a temperature unit 209. The voltage detection unit 205 and the current detection unit 207 communicate with batteries 211 and then pass the voltage, current parameters returned from the batteries 211, and the temperature of the charger detected by the temperature sensor 209 to the microprocessor 203 to calculate, adjust, and track charging power for determining the charging procedure. The DC/AC converter 201, the microprocessor 203, the voltage sensor 205, the current sensor 207, and the temperature sensor 209 can be integrated into a charger to charge the batteries 211. Charging procedure of the charger includes a pre-charging mode, a maximum power mode, a fixed voltage mode, and a completed charging mode. Detailed circuit operation will be described and explained in detail in subsequent FIGS. 4 and 6.

Figure 3A:
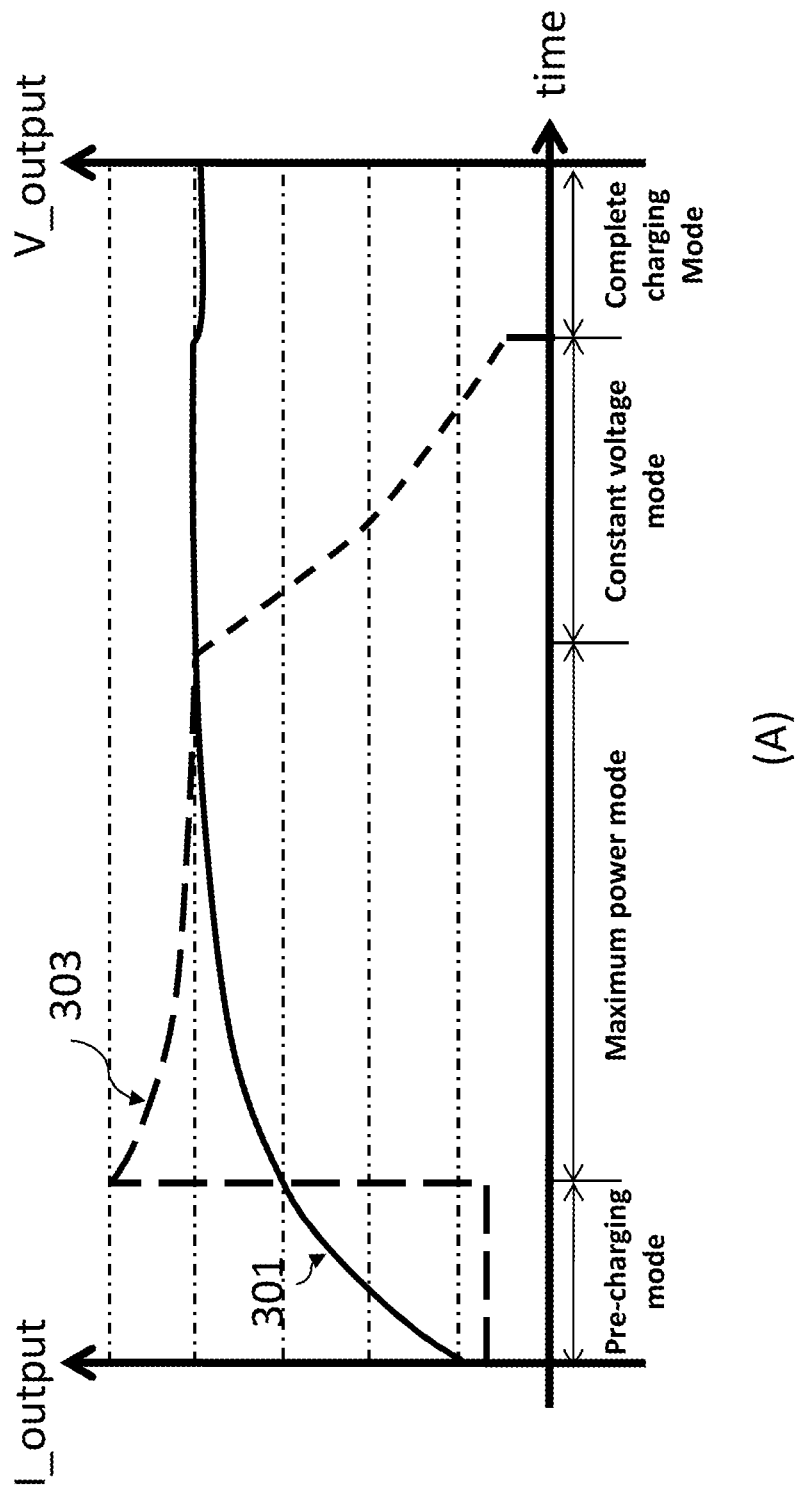
FIG. 3(A) illustrates a charging curve utilizing a maximum power tracking mode according to an embodiment of the present invention.

In one preferred embodiment, as shown in FIG. 3(A), the charging method employed by the present invention, which proceeds as follows:

(i) The charger increases the charging current (dashed curve) 303 when the battery voltage (solid curve) 301 is low, i.e., the charging current curve in the maximum power mode to maintain the maximum power value, then checking if a preset voltage is reached (similar to the conventional charging method).

(ii) While the battery reaching the preset voltage, a constant voltage mode and a completed charging mode are proceeded until the entire charging process is completed.

Figure 3B:
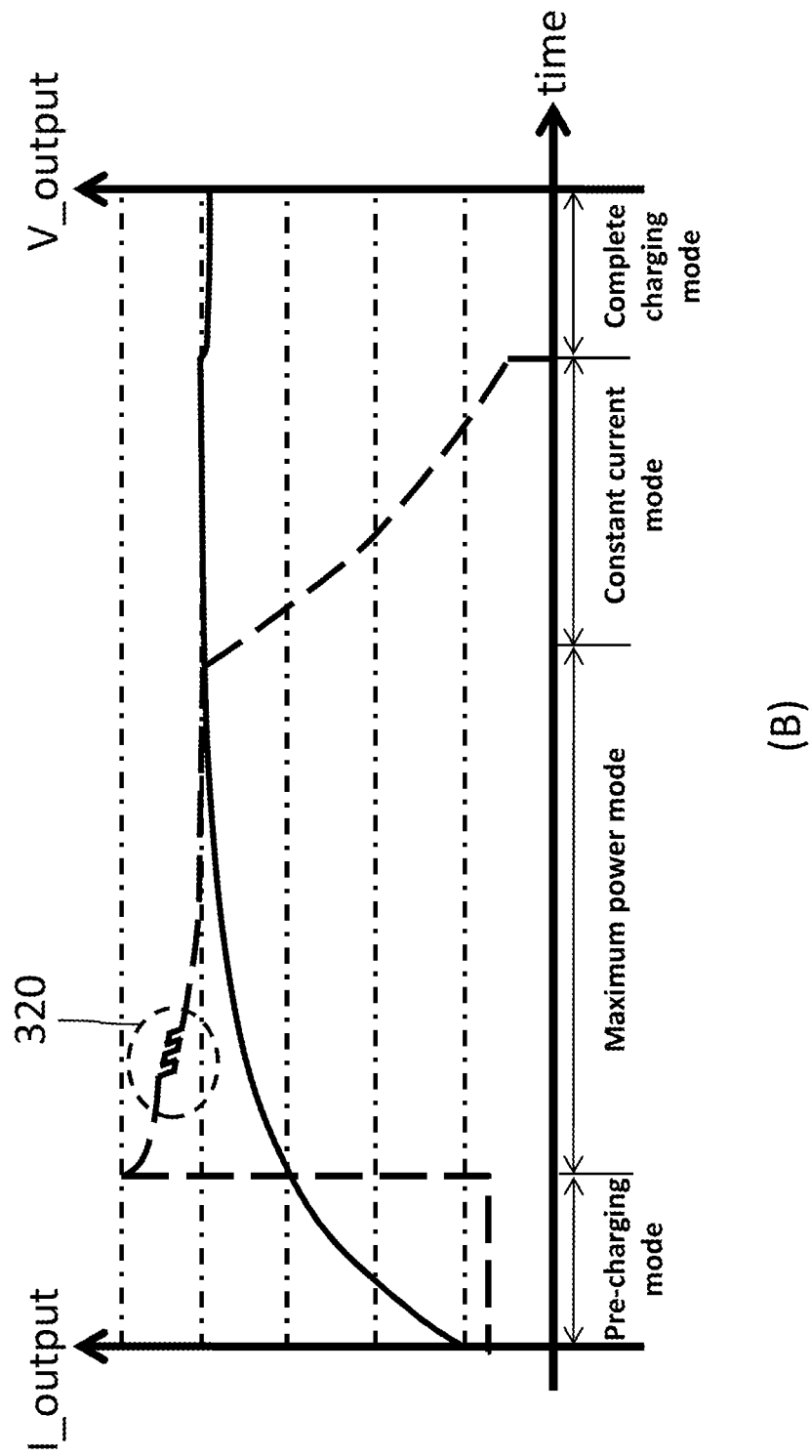
FIG. 3(B) illustrates a charging curve for current adjustment utilizing a maximum power tracking mode according to an embodiment of the present invention.

In another embodiment, as shown in FIG. 3(B), the charging method employed by the present invention, which proceeds as follows:

(i) The charger increases the charging current (dashed curve) 303 when the battery voltage (solid curve) 301 is low, i.e., the charging current curve in the maximum power mode to maintain the maximum power value, then reduce the battery load in one time with one step or multiple times with continuous steps (curve 320) based on the parameters of the charging status of the battery (i.e. temperature, voltage, current etc), where the charging current of the charger can return to a value having the maximum power after the battery load reduction, and then checking if a preset voltage is reached (similar to the conventional charging method).

(ii) While the battery reaching the preset voltage, a constant voltage mode and a completed charging mode are proceeded until the entire charging process is completed.

Figure 4:
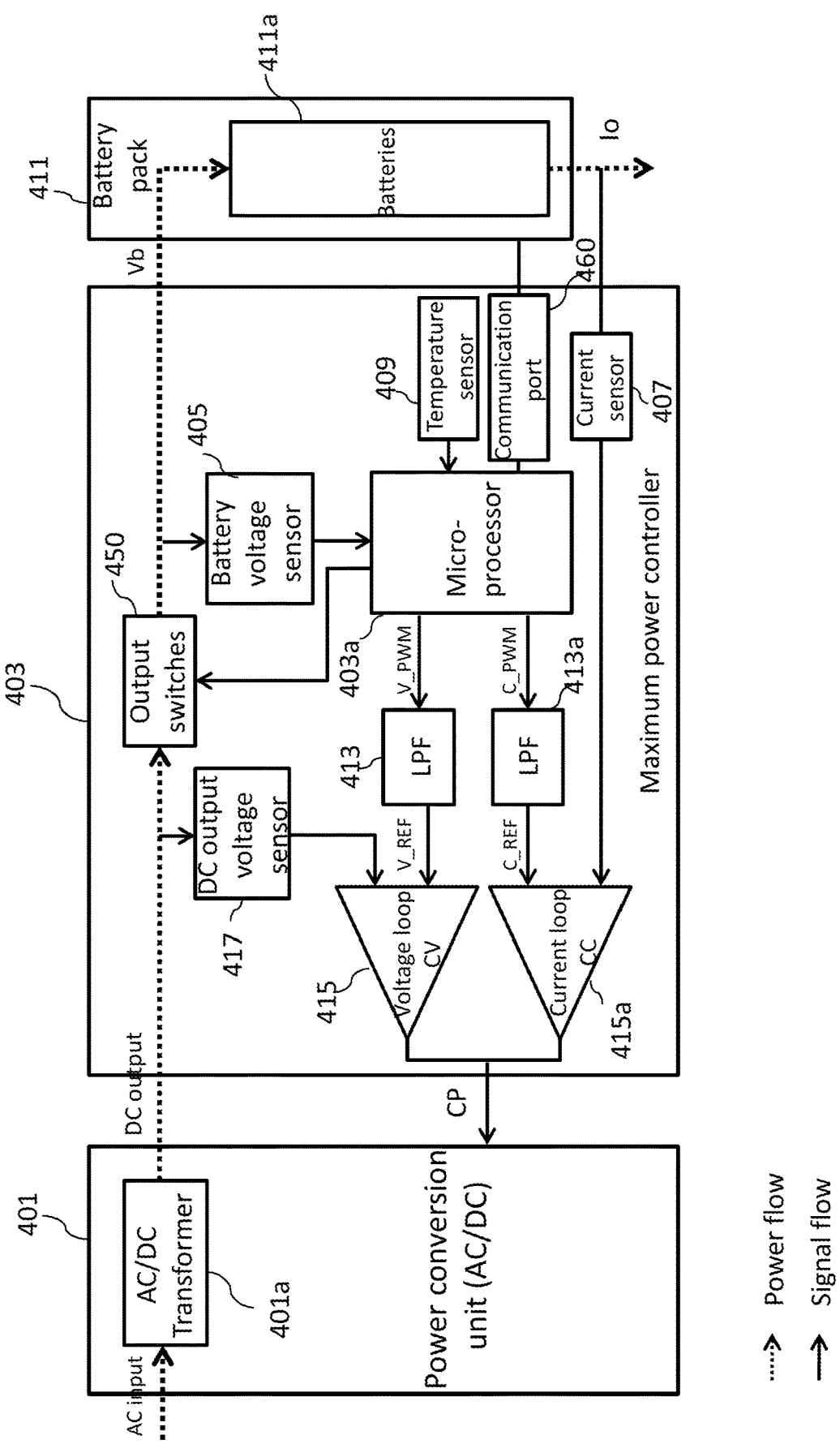
FIG. 4. illustrates charging circuit configuration and circuit block diagram according to an embodiment of the present invention.

In FIG. 4, charging circuit configuration and circuit block diagram is depicted, which includes a power conversion unit 401 and a maximum power controller 403 to perform the charging for a battery pack 411, the power conversion unit 401 is used to convert an alternating current (AC) from the Taipower power system into a safe direct current (DC), provide power source for batteries and peripheral circuits, such as maximum power controller 403. The maximum power controller 403 utilizes a battery voltage sensor 405 to detect the voltage Vb of the battery pack 411, a current sensor 407 to detect the output current Io of the batteries 411a, and a temperature sensor 409 to detect the temperature of the charger. By performing calculations through a microprocessor 403a based on the detected parameters (Vb, Io, temperature), the microprocessor 403a outputs digital signals V_PWM and C_PWM, which are respectively converted into analog signals V_REF and C_REF through low-pass filters (LPF) 413 and 413a, as the input reference signals for their corresponding voltage loops feedback compensation operational amplifier 415 and current loops feedback compensation operational amplifier 415a. Each input reference signal is subtracted from the actual output signal to get the error signal, where the actual battery voltage (battery current) output is detected by the DC output voltage sensor 417 (current sensor 407), and then a CP level is adjusted by the negative feedback control based on the error signal. The power conversion unit 401 adjusts the value of DC output based on the CP level to meet the charging power specification. The magnitude of the above-mentioned digital signal V_PWM determines the magnitude of the output voltage. If the battery voltage Vb is in an over-discharge condition (the voltage is relatively low), the initial charging voltage of the charger in the pre-charging mode should not be set too high for avoiding a voltage difference between the two sides of output switches 450 and can prevent an inrush current appeared to damage components of the charger. Detecting the charger temperature is used to determine charging voltage of the charger at high temperature by setting its output voltage to be slightly lower than its charging voltage at room temperature. Digital signal V_PWM is produced by the microprocessor 403a. The magnitude of Digital signal C_PWM, which is produced by the microprocessor 403a, is determined by the battery voltage Vb and the charger temperature at that instant moment. Output switches 450 can disconnect the batteries 411a from the charger under certain conditions to avoid damage caused by the reverse current. Once the battery pack 411 is connected to the communication port 460, the master-slave relationship between the battery pack 411 and the charger can be established through communication. In the case that the battery pack 411 is main and the charger is slave, parameters such as Vb, Io, and temperature can be sent by the batteries 411a to adjust the parameters of the charger. On the contrary, in the case that the battery charger is master and the battery pack 411 is slave, the charging procedure of the battery charger is determined by the battery voltage Vb and the charger temperature. The dotted arrows in the figure indicate the power flow direction, and the solid arrows indicate the signal flow direction.

Figure 5:
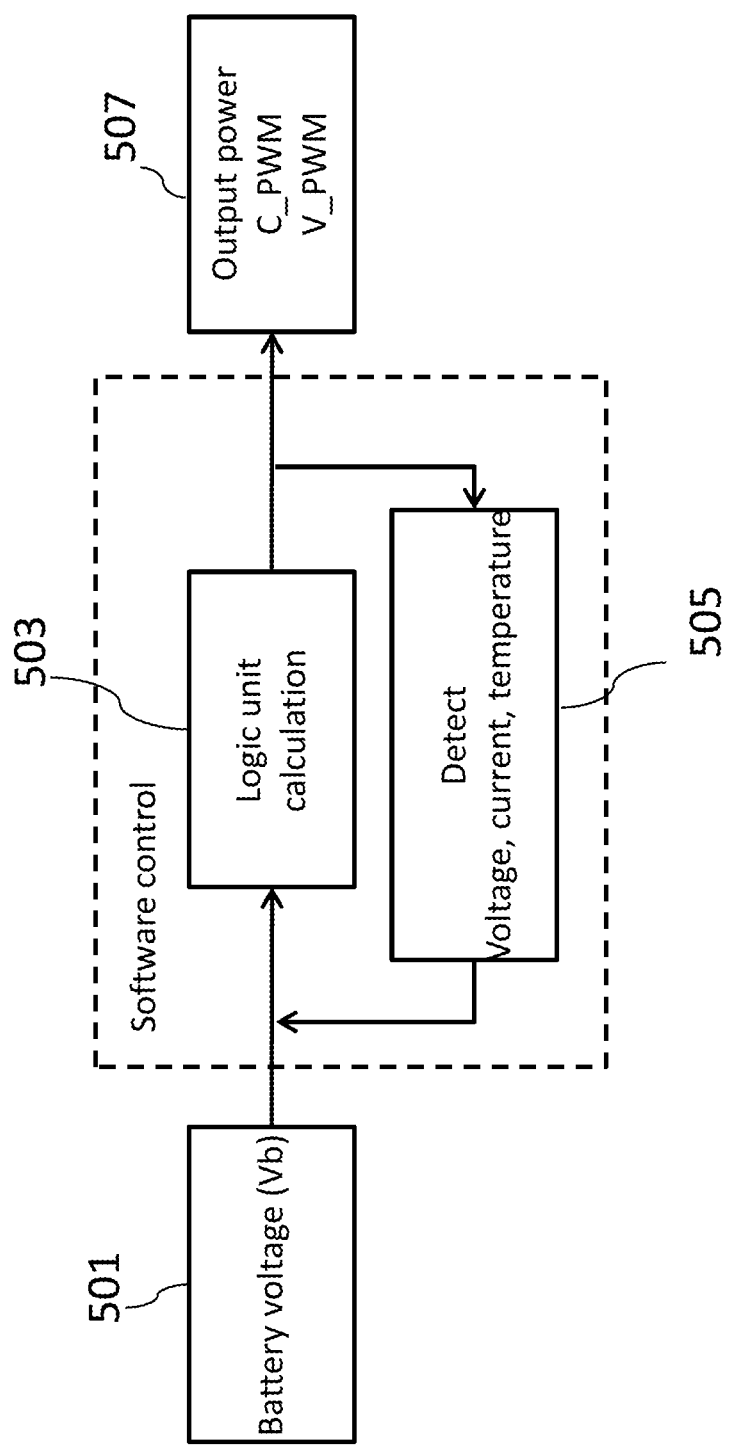
FIG. 5 illustrates a software control method according to an embodiment of the present invention.

FIG. 5 illustrates a software control method according to an embodiment of the present invention, it demonstrates that the maximum charging power tracking can be accomplished through detecting battery voltage Vb 501, feeding it into the logic unit of the microprocessor to perform calculation 503, and then detecting instant battery voltage, output current of the batteries Io, and variances of the charger temperature 505 for tracking the maximum power and adjusting the DC output power through outputting updated power control signals (C_PWM, V_PWM) 507.

Figure 6:
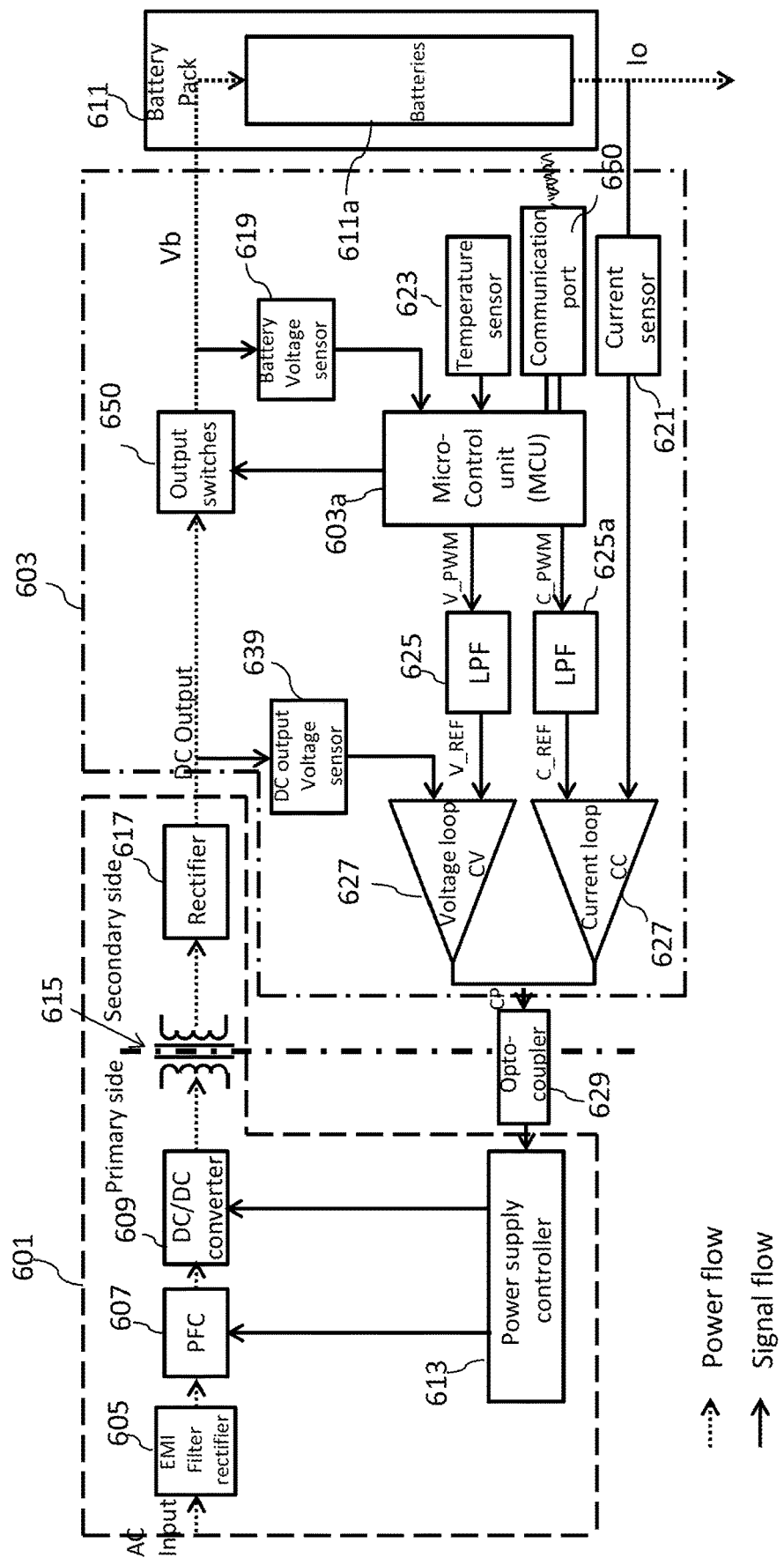
FIG. 6 illustrates a charging system block diagram according to an embodiment of the present invention.

In FIG. 6, a charging system block diagram is depicted, which includes a power conversion unit 601 and a maximum power controller 603 to perform the charging for a battery pack 611. The power conversion unit 601 includes an EMI filter rectifier 605, a power factor circuit (PFC) 607, a DC/DC converter 609, a power supply controller 613, a transformer 615, and a rectifier 617, where an AC input voltage is filtered and rectified by the EMI filter rectifier 605 to form a DC voltage, after adjusting phase by the PFC 607 and then outputting to an input terminal of the primary of the transformer 617 via the DC/DC converter 609, the energy storage is controlled by the power supply controller 613. The battery pack 611 can be charged by controlling the DC output via the control of the maximum power controller 603 in conjunction with the secondary side rectifier 617 connected to the transformer 615. The maximum power controller 603 utilizes the battery voltage sensor 619 to detect the voltage Vb of the battery pack 611, the current sensor 621 to detect the output current Io of the batteries 611a, and the temperature sensor 623 to detect the temperature of the charger. By performing calculations through the microcontrol unit (MCU) 603a based on the detected parameters (Vb, Io, temperature), MCU 603a outputs digital signals V_PWM and C_PWM, which are respectively converted into analog signals V_REF and C_REF through the low-pass filters (LPF) 625 and 625a, as input reference signals for the corresponding voltage loops feedback compensation operational amplifier 627 and current loops feedback compensation operational amplifier 627a. Each input reference signal is subtracted from the actual output signal to get the error signal, where the actual battery voltage (battery current) output is detected by the DC output voltage sensor 639 (current sensor 621), and then a CP level is adjusted by the negative feedback control base on the error signal. The power conversion unit 601 adjusts the value of DC output based on the CP level to meet the charging power specification. The magnitude of the above-mentioned digital signal V_PWM determines the magnitude of the output voltage. If the battery voltage Vb is in an over-discharge condition (the voltage is relatively low), the initial charging voltage of the charger in the pre-charging mode should not be set too high for avoiding a voltage difference between the two sides of the output switches 650 and can prevent an inrush current appeared to damage components of the charger. Detecting the charger temperature is used to determine the charging voltage of the charger at high temperature by setting its output voltage to be slightly lower than its charging voltage at room temperature. Digital signal V_PWM is produced by the MCU 603a. The magnitude of Digital signal C_PWM, which is produced by the MCU 603a, is determined by the battery voltage Vb and the charger temperature at that moment. Output switches 650 can disconnect the batteries 611a from the charger under certain conditions to avoid damage caused by the reverse current. Once the battery is connected to the communication port 660, the master-slave relationship between the battery and the charger can be established through communication. In the case that the battery is main and the charger is slave, parameters such as Vb, Io, and temperature can be sent by the batteries to adjust the parameters of the charger. On the contrary, in the case that the battery charger is master and the battery is slave, the charging procedure of the battery charger is determined by the voltage Vb and the charger temperature. The dotted arrows in the figure indicate the power flow direction, and the solid arrows indicate the signal flow direction.

According to the contents described above, the present invention proposes a power management method of a battery charger, which provides advantages over conventional methods to achieve fast charging of the battery, to reduce waiting time of the users, and to improve their working efficiency through detecting the battery voltage, charging current and charging temperature, and determining the charging procedure for charging the battery.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. An AC to DC power management method of a battery charger, comprising:
   a power conversion unit; and
   a charging control device electrically connected to the power conversion unit;
   wherein the charging control device includes:
   a microcontroller;
   a voltage detecting unit electrically connected to the microcontroller;
   a current detecting unit electrically connected to the microcontroller;
   a temperature detecting unit electrically connected to the microcontroller; and
   a communication port electrically connected to the microcontroller;
   providing a battery pack electrically connected to the charging control device, enabling the charging control device to provide power management for the battery pack, where the battery pack provide battery parameters to the microcontroller through the communication port; and
   wherein the microcontroller can calculate charging power through received battery voltage, charger current, and temperature of the charger for an instant maximum output charging power tracking in order to adjust a DC output power of the charger.

2. The AC to DC power management method of a battery charger of claim 1, wherein the instant maximum output charging power tracking is accomplished through detecting the battery voltage, feeding the battery voltage into a logic unit of the microprocessor to perform calculation, and then detecting instant battery voltage, output current of the batteries and variances of the charger temperature to adjust the DC output power of the charger through outputting updated power control signals from the microcontroller.

3. The AC to DC power management method of a battery charger of claim 2, wherein the control signal transmitted to the power conversion unit is through an optical coupler coupled between the power conversion unit and the charging control device.

4. The AC to DC power management method of a battery charger of claim 1, wherein the charger further includes a plurality of output switches electrically connected to output terminals of the charging control device and the battery pack.

5. The AC to DC power management method of a battery charger of claim 1, wherein the charger includes a charging procedure determined by communicating with the battery pack, which is sequentially performed in a pre-charging mode, a maximum power mode, a constant voltage mode, and a completed charging mode.

6. The AC to DC power management method of a battery charger of claim 5, wherein the charging procedure can be carried out at the stage of the maximum power mode according to the temperature of the charger to perform battery load reduction in one time with one step or multiple times with continuous steps, charging current of the charger can return to a value having the maximum power after the battery load reduction.

7. The AC to DC power management method of a battery charger of claim 5, wherein after the battery pack is connected to the charger through the communication port, the battery pack and the charger can communicate to establish a master-slave relationship between the battery pack and the charger.

8. The AC to DC power management method of a battery charger of claim 7, wherein after the battery pack establishes a master-slave relationship with the charger, if the battery pack is dominant and the charger is slave, the battery pack can transmit parameters to adjust the charging procedure of the charger.

9. The AC to DC power management method of a battery charger of claim 7, wherein after the battery pack establishes a master-slave relationship with the charger, if the charger is the master and the battery is slave, the battery voltage measured by the charger and the temperature of the charger can be used to determine the charging procedure of the charger.

10. The AC to DC power management method of a battery charger of claim 1, wherein the battery parameters includes the battery voltage, battery current, and temperature.

* * * * *